Aug. 22, 1950 J. M. WILKINS 2,519,805
PRESSURE REGULATOR VALVE
Filed July 1, 1946
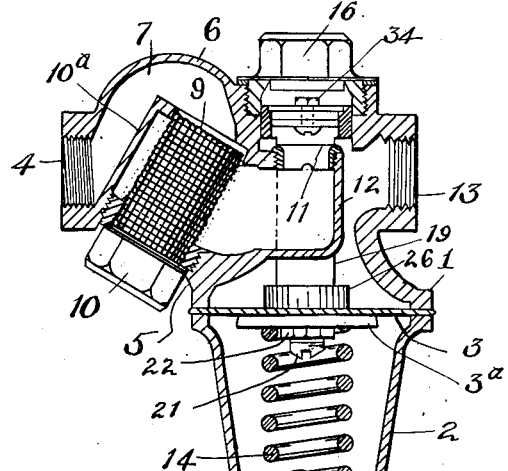
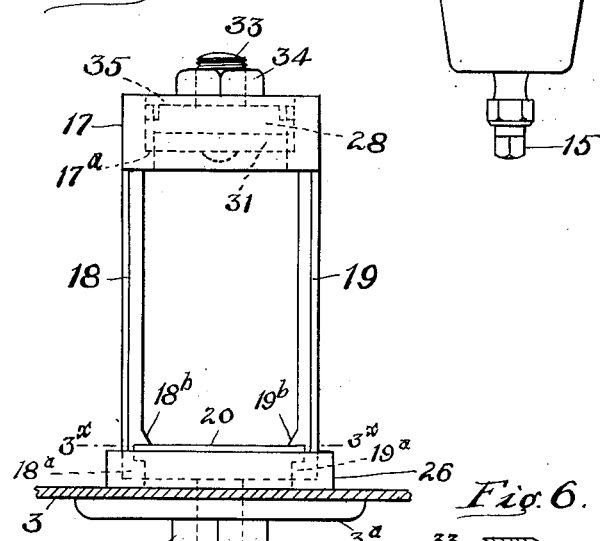
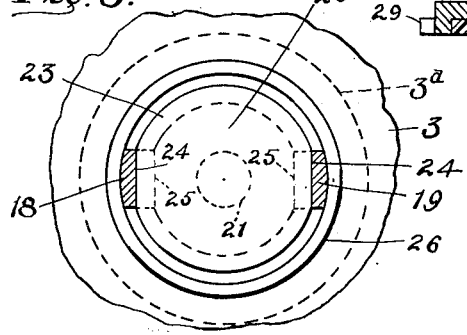
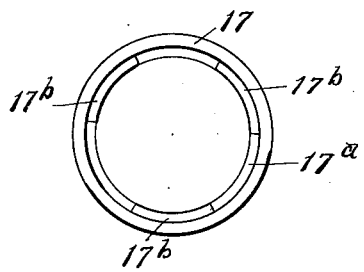
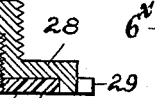
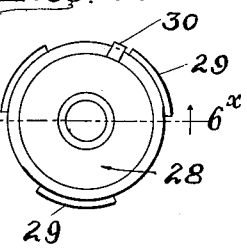
INVENTOR.
James M. Wilkins
BY
Munn, Liddy, Glaccum & Rich
Attys.

Patented Aug. 22, 1950

2,519,805

UNITED STATES PATENT OFFICE 2,519,805

PRESSURE REGULATOR VALVE

James M. Wilkins, Hollywood, Calif.

Application July 1, 1946, Serial No. 680,681

4 Claims. (Cl. 251—114)

My present invention has for its object to provide a pressure reducing and regulating valve and strainer in which said parts are combined in a unitary hiusing, the strainer being mounted in a novel manner to lessen the friction created by fluids or gases passing through it and arranged to form a trap for sediment which may be conveniently removed for cleaning without disturbing other parts of the valve structure.

Another object of my invention is to provide an improved mounting for valve heads such as are used in conjunction with the valve seats of pressure regulators and relief valves, consisting generally of means for demountably connecting the head element to a supporting member whereby it may be readily replaced when worn without disturbing said support.

A further object of my invention is to provide a valve head support or yoke for use in connection with diaphragm controlled valves with an improved form of attachment between these parts which holds the yoke rigid and prevents its turning on the diaphragm when the valve seat is being replaced.

A still further object of the invention is to provide a regulating valve and cylindrical strainer positioned at an angle to the inlet and adjacent to the valve regulating mechanism whereby the over-all width of the casing as defined by the inlet and outlet ports is reduced to a minimum and no space of substantial area exists for the lodgment of particles of foreign material beneath the valve head.

To these and other ends my invention comprehends further improvements in construction all as will be fully described in the accompanying specification, the novel features thereof being set forth in the appended claims.

In the drawings:

Figure 1 is a vertical sectional view of a pressure regulator valve constructed in accordance with my invention.

Figure 2 is an enlarged side elevation of the valve yoke.

Figure 3 is a horizontal sectional view taken on the line 3x—3x of Fig. 2 showing the yoke mounting.

Figure 4 is an end view of yoke ring, the valve head being removed therefrom.

Figure 5 is a plan view of the valve head.

Figure 6 is a cross sectional view of the valve head taken on the line 6x—6x of Fig. 5.

Similar reference numerals in the several figures indicate similar parts.

My present invention relates to that type of valve in which a housing is divided into inlet and outlet compartments between which communication is controlled by a pressure operated valve head, the pipe line pressure acting against a spring controlled flexible diaphragm which serves to regulate the operation of the valve head relatively to its seat. In Fig. 1 I have shown a housing comprising upper and lower parts 1 and 2 which are bolted together to secure between them a flexible diaphragm 3.

The upper portion of the housing is extended somewhat at one side to provide an inlet port 4. The extension on its lower side has an inclined bottom wall 5 and a domed shaped top wall 6 forming between them a fluid entrance chamber 7 of sufficient size to accommodate a cylindrical screen or filter 8 closed on its inner end 9 and removably secured in place by mounting its outer end in a screw cap 10 threaded into an aperture in the wall 5. Fluid entering the port 4 is directed into the top of the filter by partially surrounding it with a segmental partition 10a as shown in Fig. 1.

The outlet from chamber 7 beyond the filter extends through a port formed by the horizontal valve seat 11 supported on the wall 12 and disposed above the outlet port 13 of the casing 1. The wall 12 is so designed that fluid passing through the valve seat 11 and seeking escape through the port 13 will also exert pressure against the upper side of diaphragm 3. To counteract this pressure I provide in the section 2 a coil spring 14 bearing against a plate 3a on the underside of the diaphragm, the tension of which may be regulated by a set screw 15, as will be understood.

Above the valve seat 11 the casing 1 is provided with an opening, normally closed by a screw cap 16, of sufficient area for the convenient introduction and removal of the valve head which cooperates with the valve seat 11 and the yoke ring on which it is carried, the inner walls of the aperture and cap being concentric with the valve seat and serving as a guide for a top ring on a yoke to which the valve head is secured.

The valve head which cooperates with seat 11 is moved relatively thereto by variations of pressure affecting the movement of diaphragm 3 and is carried by a yoke comprising a ring 17 supported on legs 18—19 which straddle the valve seat 11 and the sides of wall 12 and extend downwardly to the diaphragm 3.

Connection between the yoke and diaphragm I accomplish thus: On the diaphragm I mount a disc 20 having a threaded stud 21 extending through the diaphragm 3 and its bearing plate 3a and secured by a nut 22. The disc 20 has an annular flange 23 around its upper edge. This flange is flattened at opposite sides, as indicated by 24, and the underlying side walls of the disc are also flattened as indicated by 25 (Fig. 3). The dimensions of these parts are such as to fit between the legs 18—19 which latter are provided at their lower extremities with inwardly extending projections 18a—18a which engage beneath the flange 23. The yoke legs are also provided with inwardly extending projections 18b, 19b which rest upon the upper face of the disc 20. From this construction of the parts it will be seen that the yoke and disc 20 may be assembled by a relatively lateral movement of the parts and that the flattened surfaces 24 and 25 prevent one element from rotating on the other. Also that the interlocking connections between them prevent a lengthwise movement of the yoke in either direction upwardly or downwardly.

As a means for permanently securing the legs of the yoke to the disc I employ a locking member in the form of a ring 26 which embraces their outer faces and has a bottom flange 27 which is bored to fit the smaller diameter of disc 20 and then extends beneath the ends of the yoke legs. This assembly, it will be seen, may be effected, as shown in Fig. 2, before the stud 21 is passed through the diaphragm and secured by nut 22.

The valve head which cooperates with the valve seat 11 is carried in the yoke ring 17 and since these parts frequently require to be renewed I make the valve seat in the form of a threaded ring, as shown, and provide a novel means for mounting the valve head whereby it may be easily disconnected upon removal of the casing closure, or screw plug 16.

Within the ring 17 at its lower edge is an annular shoulder 17a and above the latter there are three spaced segmental lugs 17b the tops of which are countersunk below the upper edge of the ring. Fitting within the ring is a circular plate 28 having spaced segmental flanges 29, said plate and flanges being dimensioned to fit within the ring 17 and beneath the lugs 17b, when inserted in the ring, and to engage beneath the latter when the plate is given a partial rotation. In order to limit the rotary movement of the plate I provide it with a stop 30 which engages with the side of one of the lugs 17b. The plate 28 is recessed upon its underside to receive an insert of indurated fiber, hard rubber, or other suitable material, as indicated by 31, secured by a screw 32, for forming a tight closure with the valve seat 11. On its outer face the plate is provided with a threaded stud 33 carrying a nut 34 by means of which it may be clamped to a cover plate 35 fitted within the ring 17 and resting on the outer ends of the lugs 17b.

From an understanding of the arrangement and operation of the valve parts the angular position of the cylindrical screen will be more fully appreciated. By locating it thus I am able to lessen the width of the valve case between its inlet 4 and outlet 13. This also materially lessens the space surrounding the valve seat 11 on which sedimentary particles, as fibres which may escape the trap may become lodged and eventually work their way onto the seat to interfere with the proper closing of the valve head thereon.

Another highly important advantage is found in the use of a cylindrical screen and disposing it at an angle with its inner end adjacent the valve seat. It will be seen from this disposition of the parts that I am able to avoid a right angle turn in the fluid inlet path which lessens the friction of fluids and gases. Also by introducing these into the top of a cylindrical screen, the circumference of which provides a greatly increased outlet area, sedimentary particles may more readily gravitate to the bottom and lodge in the central recess of the screw cap 10 which may be removed from time to time for the purpose of cleaning the screen.

It will be seen from the above described arrangement of parts that I have provided a practical and easily constructed form of pressure reducing and regulating valve in which the valve mechanism and strainer are located in a single housing with the strainer located in an angular position for ready removal without interference with other parts of the structure. Furthermore the novel construction of the yoke ring and valve head assembly assures the proper positioning and accurate movement of the valve head with reference to its seat both upon the initial assembly of the parts and subsequently when worn parts are replaced by new ones.

What I claim as my invention and desire to secure by Letters Patent is:

1. A pressure regulator valve mechanism comprising a casing having inlet and outlet ports and a valve seat located between them, a reciprocative yoke straddling said valve seat, lugs spaced within the yoke, a valve head cooperating with the valve seat and comprising a plate having segmental projections fitting between and engageable beneath the lugs, and means for locking the plate in such position of engagement.

2. A pressure regulator valve mechanism comprising a casing having inlet and outlet ports and a valve seat located between them, a reciprocative yoke comprising a ring located above the valve seat having internally spaced lugs, a notched plate carrying a valve head cooperating with the valve seat carried by the ring, said plate being removably engaged beneath said lugs.

3. A pressure regulator valve mechanism comprising a casing having inlet and outlet ports and a valve seat located between them, a reciprocative yoke comprising a ring located above the valve seat having internally spaced lugs, a valve head cooperating with the valve seat and comprising a plate carried by the ring having spaced flanges fitting between and engageable beneath the lugs, and means for locking the plate in such position of engagement.

4. In a pressure regulator valve mechanism, the combination with a casing having inlet and outlet ports, and a valve seat located between them, a yoke ring positioned above the valve seat and having depending legs straddling the valve seat, lugs spaced within the ring, a valve head cooperating with the valve seat, said head comprising a plate having segmental flanges fitting between the lugs and engageable beneath them by rotary movement relative thereto, a stud on the plate, a top plate fitting over the top of the ring and said stud and a fastening member engaging the stud and plate for locking the valve head to the ring.

JAMES M. WILKINS.

REFERENCES CITED

The following references are of record in the file of this patent:

UNITED STATES PATENTS

| Number | Name | Date |
| --- | --- | --- |
| 1,062,300 | Pierce | May 20, 1913 |
| 1,455,430 | DeLuiz | May 15, 1923 |
| 1,585,885 | Anderson | May 25, 1926 |
| 1,651,237 | Wilkins | Nov. 29, 1927 |
| 1,703,674 | Kiley | Feb. 26, 1929 |
| 1,937,314 | Bryant | Nov. 28, 1933 |
| 2,059,855 | Dresback | Nov. 3, 1936 |
| 2,089,144 | Work | Aug. 3, 1937 |
| 2,496,679 | Saurer | Feb. 7, 1950 |